US010044059B2

(12) United States Patent
Yano

(10) Patent No.: US 10,044,059 B2
(45) Date of Patent: Aug. 7, 2018

(54) ELECTROLYTE-CIRCULATING BATTERY

(71) Applicant: Sumitomo Electric Industries, Ltd., Osaka-shi (JP)

(72) Inventor: Keiji Yano, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/314,376

(22) PCT Filed: May 12, 2015

(86) PCT No.: PCT/JP2015/063542
§ 371 (c)(1),
(2) Date: Nov. 28, 2016

(87) PCT Pub. No.: WO2015/182364
PCT Pub. Date: Dec. 3, 2015

(65) Prior Publication Data
US 2017/0200965 A1 Jul. 13, 2017

(30) Foreign Application Priority Data
May 29, 2014 (JP) .................................. 2014-111732

(51) Int. Cl.
*H01M 2/38* (2006.01)
*H01M 8/18* (2006.01)
(Continued)

(52) U.S. Cl.
CPC ......... *H01M 8/188* (2013.01); *H01M 8/0432* (2013.01); *H01M 8/04067* (2013.01); *H01M 8/04708* (2013.01); *H01M 8/04753* (2013.01)

(58) Field of Classification Search
CPC ............... H01M 8/188; H01M 8/0432; H01M 8/04708; H01M 8/04067; H01M 8/04753
(Continued)

(56) References Cited

U.S. PATENT DOCUMENTS

2012/0321920 A1* 12/2012 Perry ................ H01M 8/04029
429/51
2013/0302710 A1 11/2013 Boersma et al.

FOREIGN PATENT DOCUMENTS

| CN | 201435423 Y | 3/2010 |
| JP | 05-343089 A | 12/1993 |

(Continued)

OTHER PUBLICATIONS

Extended European Search Report in counterpart European Patent Application No. 15799476.5 dated Feb. 13, 2017.
(Continued)

*Primary Examiner* — Gary Harris
(74) *Attorney, Agent, or Firm* — Venable LLP; Michael A. Sartori; Laura G. Remus

(57) ABSTRACT

An electrolyte-circulating battery in which the electrolyte temperature is easily controlled is provided. An electrolyte-circulating battery includes a battery cell and a circulation channel that circulates an electrolyte to the battery cell. The electrolyte-circulating battery comprises a heat exchanger installed in the circulation channel and configured to cool the electrolyte; a bypass flow channel that connects an electrolyte inflow side and an electrolyte outflow side of the heat exchanger to each other so as to bypass the heat exchanger; and a flow rate variable mechanism capable of varying a flow rate of the electrolyte flowing through the heat exchanger and a flow rate of the electrolyte flowing through the bypass flow channel.

6 Claims, 5 Drawing Sheets

(51) Int. Cl.
    *H01M 8/04746* (2016.01)
    *H01M 8/04007* (2016.01)
    *H01M 8/0432* (2016.01)
    *H01M 8/04701* (2016.01)

(58) Field of Classification Search
    USPC .......................................................... 429/81
    See application file for complete search history.

(56) References Cited

FOREIGN PATENT DOCUMENTS

| | | |
|---|---|---|
| JP | 2005-071704 A | 3/2005 |
| JP | 2005-071740 A | 3/2005 |
| JP | 2010-170782 A | 8/2010 |
| JP | 2012-221657 A | 11/2012 |
| JP | 2013-037776 A | 2/2013 |
| JP | 2013-076146 A | 4/2013 |
| JP | 2013-206566 A | 10/2013 |
| WO | 2006/064955 A1 | 6/2006 |

OTHER PUBLICATIONS

International Search Report in counterpart International Application No. PCT/JP2015/063542, dated Aug. 18, 2015.

\* cited by examiner

110: 110u, 110d
111: 111u, 111d

ELECTROLYTE-CIRCULATING BATTERY

TECHNICAL FIELD

The present invention relates to electrolyte-circulating batteries such as redox flow batteries. In particular, it relates to an electrolyte-circulating battery in which the temperature of an electrolyte is easily controlled.

BACKGROUND ART

Electrolyte-circulating batteries such as redox flow batteries (RF batteries) are one type of high-capacity storage batteries used to store power generated by natural energy such as solar power and wind power. RF batteries are a type of batteries that perform charging and discharging by using the difference in oxidation-reduction potential between ions contained in positive electrode electrolytes and ions contained in negative electrode electrolytes. An example of the RF batteries is described in PTL 1.

As illustrated in an operation principle diagram of art RF battery in FIG. 5, the RF battery of PTL 1 includes a battery cell 100 that includes a positive electrode cell 102 and a negative electrode cell 103 separated from each other with a membrane 101 that allows hydrogen ions to permeate through. The positive electrode cell 102 has a positive electrode 104 inside and is connected to a positive electrode electrolyte tank 106, which stores a positive electrode electrolyte, via a circulation channel having an inflow channel 108 and an outflow channel 110. Likewise, the negative electrode cell 103 has a negative electrode 105 inside and is connected to a negative electrode electrolyte tank 107, which stores a negative electrode electrolyte, via a circulating channel having an inflow channel 109 and an outflow channel 111.

The electrolytes in the tanks 106 and 107 flow into the cells 102 and 103 through the inflow channels 108 and 109, respectively, when pumps 112 and 113 provided in the inflow channels 108 and 109 are driven, flow out of the cells 102 and 103, flow through the outflow channels 110 and 111, and are discharged into the tanks 106 and 107 so that the electrolytes circulate to the cells 102 and 103. Typically, aqueous solutions that contain metal ions, such as vanadium ions, whose valence changes by oxidation-reduction reactions are used as the electrolytes. Since the flow channels 108 to 111 come in direct contact with the electrolytes, they are formed of ducts composed of a material unreactive and highly resistant to the electrolyte, such as polyvinyl chloride (PVC). In FIG. 5, arrows in solid lines indicate charging and arrows in broken lines indicate discharging.

In an RF battery 1, the electrolytes generate heat due to battery reaction. The generated heat can degrade battery efficiency and deterioration such as softening of the resin constituting the flow channels 108 to 111 in contact with the electrolytes may occur. To address this issue, in the RF battery 1, heat exchangers 114 and 115 are installed in the outflow channels 110 and 111. Typically, the heat exchangers 114 and 115 each have a cooling region constituting a part of the circulation channel, and the electrolyte inside the cooling region is cooled with a cooling mechanism (not shown in the drawing). The flow channels of the heat exchangers meander as they extend from its inlet to its outlet. The electrolytes have heat removed therefrom as they travel from the inlet to the outlet of the heat exchanger so as to be cooled. A water cooling method with which heat exchangers are cooled with cooling water or an air cooling method with which air is forcibly blown toward heat exchangers is employed for cooling. The flow channels of the heat exchangers may be formed of a plurality of branching straight lines through a course from the inlet to the outlet instead of meandering channels described above.

CITATION LIST

Patent Literature

PTL 1: Japanese Unexamined Patent Application Publication No. 2013-206566

SUMMARY OF INVENTION

Technical Problem

Typically, heat exchangers are designed by assuming the highest temperature the electrolytes can reach in an environment of installation. In summer when the temperatures of the electrolytes tend to rise, the electrolytes can be appropriately cooled the heat exchangers. However, when the temperatures of the electrolytes tend to drop, such as during the winter time, electrolytes are significantly overcooled. In particular, in an environment where the gap between the highest temperature and the lowest temperature is wide, the electrolytes are severely overcooled in winter. If the temperatures of the electrolytes drop, the viscosity of the electrolytes increases and this increases the pressure loss. As a result, charge-discharge reactions are inhibited, which leads to lower battery efficiency and degraded battery performance.

The present invention has been made under the circumstances described above. One of the objects is to provide an electrolyte-circulating battery in which the temperatures of the electrolytes is easy to adjust.

Solution to Problem

An electrolyte-circulating battery according to an aspect of the present invention is equipped with a battery cell and a circulation channel that circulates an electrolyte to the battery cell. The electrolyte-circulating battery also includes a heat exchanger, a bypass flow channel, and a flow rate variable mechanism. The heat exchanger is installed in the circulation channel and configured to cool the electrolyte. The bypass flow channel connects an electrolyte inflow side and an electrolyte outflow side of the heat exchanger to each other so as to bypass the heat exchanger. The flow rate variable mechanism is capable of varying a flow rate of the electrolyte flowing through the heat exchanger and a flow rate of the electrolyte flowing through the bypass flow channel.

Advantageous Effects of Invention

According to the above-described electrolyte-circulating battery, the temperature of the electrolyte is easily controlled.

DESCRIPTION OF EMBODIMENTS

<<Description of Embodiments of the Invention>>

Figure 1:
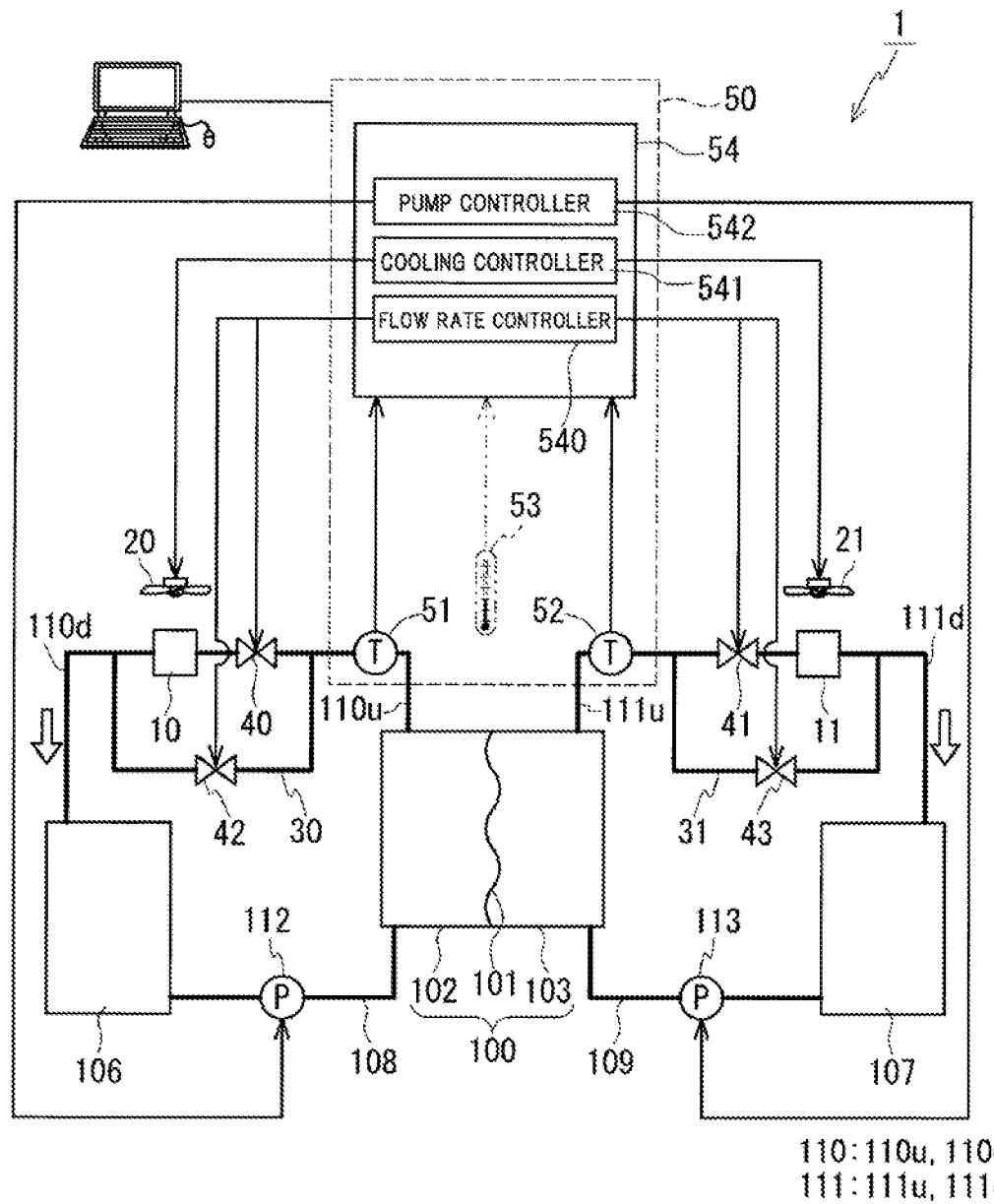
FIG. 1 is a schematic diagram of a redox flow battery according Embodiments 1 to 4.

First, the contents of the embodiments of the present invention are listed and described.

(1) An electrolyte-circulating battery according to an aspect of the present invention is equipped with a battery cell and a circulation channel that circulates an electrolyte to the battery cell. The electrolyte-circulating battery also includes a heat exchanger, a bypass flow channel, and a flow rate variable mechanism. The heat exchanger is installed in the circulation channel and configured to cool the electrolyte. The bypass flow channel connects an electrolyte inflow side and an electrolyte outflow side of the heat exchanger to each other so as to bypass the heat exchanger. The flow rate variable mechanism is capable of varying a flow rate of the electrolyte flowing through the heat exchanger and a flow rate of the electrolyte flowing through the bypass flow channel.

According to the above-described structure, the heat exchanger is provided so that the electrolyte can be cooled when the electrolyte temperature tends to rise such as during the summer time. Since the bypass flow channel that bypasses the heat exchanger and the flow rate variable mechanism are provided, overcooling of the electrolyte can be suppressed when the electrolyte temperature tends to drop such as during the winter time. This is because at least part of the electrolyte can be caused to flow through the bypass flow channel and the electrolyte that flows through the bypass flow channel is not cooled by the heat exchanger. Thus, if the electrolyte needs to be cooled, the electrolyte can be cooled as needed while avoiding an excessive decrease in electrolyte temperature due to overcooling; hence, the temperature of the electrolyte is easily controlled. As a result, the charge/discharge reaction can be promoted and the battery performance can be enhanced.

Moreover, since at least part of the electrolyte flows through the bypass flow channel, the pressure loss can be decreased. This is due to the following reason. Typically, a heat exchanger frequently includes at least one selected from a flow channel having a small cross sectional area (diameter), a long flow channel having at large total length, and a flow channel with multiple branches in comparison to other circulation channels. The bypass flow channel can have the same diameter as that of the circulation channel other than the heat exchanger and at least part of the electrolyte can be made to flow through the bypass flow channel; thus the amount of the electrolyte flowing through the heat exchanger can be decreased.

Since at least part of the electrolyte can be made to flow through the bypass flow channel, overcooling of the electrolyte can be suppressed and the increase in viscosity of the electrolyte can be suppressed. Thus, the pressure loss can be decreased.

(2) The electrolyte-circulating battery described above may include a measurement sensor and a flow rate controller, for example, as one embodiment. The measurement sensor measures a physical quantity related to a temperature of the electrolyte. The flow rate controller controls a flow rate of the electrolyte that flows into the heat exchanger and a flow rate of the electrolyte that flows into the bypass flow channel by using the flow rate variable mechanism on a basis of a measurement result obtained from the measurement sensor.

Since the flow rate controller controls the flow rate of the electrolyte that flows into the heat exchanger and the flow rate of the electrolyte that flows into the bypass flow channel by using the flow rate variable mechanism on a basis of a measurement result obtained from the measurement sensor, the electrolyte temperature can be accurately adjusted.

(3) When the electrolyte-circulating battery described above includes a measurement sensor and a flow rate controller as one embodiment, the measurement sensor may include, for example, at least one selected from a liquid temperature sensor that measures a temperature of the electrolyte and an air temperature sensor that measures an ambient temperature.

According to this structure, since the temperature sensor is provided, the electrolyte temperature can be highly accurately measured in real time and thus the electrolyte temperature can be easily adjusted. Thus, this is particularly effective for suppressing overcooling of the electrolyte. Since the air temperature sensor is provided, the ambient temperature can be measured and thus the electrolyte temperature is easily controlled. This is because the ambient temperature readily affects the changes in temperature of the electrolyte and thus a correlation with the electrolyte temperature is easy to be obtained. Moreover, compared to a liquid temperature sensor such as one that directly measures the temperature of the electrolyte, the arrangement and structure are simple. If both sensors are provided, the physical quantity can still be measured in the event that one of the sensors malfunctions and cannot measure the physical quantity, by using the other sensor.

(4) When the electrolyte-circulating battery described above includes a measurement sensor as one embodiment, the electrolyte-circulating battery may further include, for example, a cooling mechanism that cools the heat exchanger and a cooling controller that controls operation of the cooling mechanism on a basis of a measurement result obtained from the measurement sensor.

According to the above-described structure, since the cooling controller is provided, cooling of the heat exchanger can be moderated in coordination with causing at least part of the electrolyte to flow through the bypass flow channel. In other words, when cooling of the electrolyte is suppressed by causing the electrolyte to flow through the bypass flow channel, cooling of the heat exchanger by the cooling mechanism can be moderated; thus, even when the rest of the electrolyte flows through the heat exchanger, the decrease in electrolyte temperature can be further easily suppressed. Since the cooling mechanism can be operated as needed and when needed to cool the electrolyte, energy can be saved.

(5) When the electrolyte-circulating battery described above includes a measurement sensor as one embodiment, the electrolyte-circulating battery may further include, for example, a pump that circulates the electrolyte and a pump controller that controls output of the pump on a basis of a measurement result obtained from the measurement sensor.

According to this structure, since the pump controller is provided, the output of the pump can be decreased in coordination with causing at least part of the electrolyte to flow thorough the bypass flow channel. As described above, the heat exchanger includes at least one selected from a flow channel having a small cross sectional area (diameter), a long flow channel having a large total length, and a flow channel with multiple branches in comparison to other circulation channels. Thus, when at least part of the electrolyte can be caused to flow through the bypass flow channel to decrease the flow rate of the electrolyte flowing through the heat exchanger, the output of the pump can be decreased compared to when all of the electrolyte is caused to flow through the heat exchanger. Thus, the output of the pump can be easily optimized to the minimum, which contributes to energy saving.

(6) The electrolyte-circulating battery may include, as one embodiment, a valve that is disposed in the bypass flow channel and configured to open and close the flow channel, for example.

According to this structure, the flow rate of the electrolyte flowing into the heat exchanger and that flowing into the bypass flow rate can be easily adjusted. This is because when the valve is opened, a large proportion of the electrolyte is caused to flow through the bypass flow channel although some of the electrolyte may flow through the heat exchanger and when the valve is closed, the electrolyte can be caused to flow through the heat exchanger only. When the valve is open, a large proportion of the electrolyte flows through the bypass flow channel and is not cooled by the heat exchanger. Thus, even when some of the electrolyte is cooled as it flows through the heat exchanger, the temperature of the electrolyte as a whole rarely drops to a level that affects the battery performance since it is only part of the electrolyte that is cooled. Moreover, the flow rate of the electrolyte flowing into the heat exchanger and that flowing into the bypass flow channel can be adjusted by adjusting the opening degree of the valve.

<<Details of Embodiments of the Present Invention>>

Details of the embodiments of the present invention will now be described with reference to the drawings. It should be understood that the present invention is not limited to these illustrative embodiments but defined by the claims and is intended to include all modifications and alterations within the scope of the claims and the meaning and scope of equivalents thereof. Here, a redox flow battery (RF battery) is used as an example for describing an electrolyte-circulating battery.

[Embodiment 1]

As with the RF battery of the related art described with reference to FIG. 5, an RF battery according to an embodiment includes a battery cell 100, at circulation channel (inflow channel 108 and outflow channel 110) that allows a positive electrode electrolyte in a tank 106 to circulate through a positive electrode cell 102, and a circulation channel (inflow channel 109 and outflow channel 111) that allows a negative electrode electrolyte in a tank 107 to circulate through a negative electrode cell 103. Pumps 112 and 113 installed at particular points in the respective circulation channels are used to circulate the negative and positive electrode electrolytes. The main feature of the RF battery according to this embodiment is that it includes heat exchangers installed at particular points in the circulation channels to cool the electrolytes, bypass flow channels that bypass the heat exchangers, and flow rate variable mechanism capable of varying the flow rates of the electrolytes into the heat exchangers and the bypass flow channels. In other words, the configuration of the heat exchangers and their peripheral parts of the RF battery according to Embodiment 1 are different from the RF battery of the related art; thus, in the embodiment below, the heat exchangers and their peripheral parts are mainly described. The structures of the heat exchangers and peripheral parts thereof will be described first and then other structures are described with reference to FIGS. 1 to 3 and 5. The structures identical to those of the related art are represented by the same reference numerals and the descriptions thereof are omitted.

[Heat Exchangers]

Heat exchangers 10 and 11 are installed at particular points in the circulation channels to cool the electrolytes. In other words, the heat exchangers 10 and 11 constitute part of the circulation channels. Here, the electrolytes may be cooled naturally but is preferably forcibly cooled using a cooling mechanism (fans 20 and 21) described below in order to smoothly cool the electrolytes. The heat exchangers 10 and 11 may be respectively installed in the inflow channels 108 and 109 or in the outflow channels 110 and 111, but are preferably installed in the outflow channels 110 and 111. The negative and positive electrode electrolytes generate heat as a result of battery reaction. Thus, the electrolytes can be smoothly cooled when the heat exchangers 10 and 11 are installed in the outflow channels 110 and 111. In this embodiment, the heat exchangers 10 and 11 are installed in the outflow channels 110 and 111.

The inlets of the heat exchangers 10 and 11 are connected to upstream outflow channels 110$u$ and 111$u$ of the outflow channels 110 and 111. The outlets of the heat exchangers 10 and 11 are connected to downstream outflow channels 110$d$ and 111$d$. The electrolytes flowing out of the electrode cells 102 and 103 flow from the upstream outflow channels 110$u$ and 111$u$ into the heat exchangers 10 and 11 through the inlets of the heat exchangers 10 and 11, and the heat of the electrolytes is removed as the electrolytes travel from the inlets to the outlets of the heat exchangers 10 and 11. The electrolytes whose heat has been removed therefrom return to the electrode tanks 106 and 107 from the outlets of the heat exchangers 10 and 11 through the downstream outflow channels 110$d$ and 111$d$.

The flow channel (not illustrated in the drawings) extending from the inlet to the outlet of the heat exchanger 10 and the flow channel (not illustrated in the drawings) extending from the inlet to the outlet of the heat exchanger 11 may each be constituted as a single continuous flow channel or multiple flow channels. When the flow channel is a single continuous flow channel, the flow channel is preferably formed of a meandering duct. In this manner, for the same flow-channel cross-sectional area and the same flow channel length, the size of the heat exchangers 10 and 11 and also the size of the whole unit including the cooling mechanism (fans 20 and 21) can be reduced compared to when the flow channels are straight. For the same size of the heat exchangers 10 and 11, the surface area of the ducts constituting the flow channels can be increased compared to when the flow channels are straight and the electrolytes can be more easily cooled to a desired temperature. When the flow channel is constituted by multiple flow channels, each flow channel may be formed of a straight duct or a meandering duct. For the same flow-channel cross-sectional area and the same flow channel length as those of the single continuous flow channel, the flow-channel cross-sectional area (diameter) of each flow channel can be decreased because multiple flow channels are provided. Thus, the total surface area of the ducts constituting the flow channel can be increased. Since the flow-channel cross-sectional area (diameter) can be decreased, the electrolytes at the center of the flow channels can be easily cooled.

As with the outflow channels 110 and 111, the flow channels of the heat exchangers 10 and 11 can be formed of ducts of a resin such as polyvinyl chloride (PVC), for example. Alternatively, they may be formed of multilayer composite ducts each constituted by a resin tubular main body and an oxygen blocking layer formed on the outer circumference of the main body and formed of an organic material having a lower oxygen permeability than the main body. Examples of the resin constituting the main body include PVC, polypropylene (PP), polyethylene (PE), and polytetrafluoroethylene (PTFE). Among these, PE is preferably used. Examples of the material for the oxygen blocking layer include ethylene-vinyl alcohol copolymer resin (saponified ethylene-vinyl acetate random copolymer), polyvinylidene chloride resin, polyvinyl alcohol resin, and nylon 6. When the flow channels of the heat exchangers 10 and 11 are formed of the composite ducts described above, the temperatures of the electrolytes can be smoothly decreased. That is, although the details are provided later, overcooling of the electrolytes can be suppressed by adjusting the temperature of the electrolyte by using a control mechanism 50 despite the use of the composite ducts that smoothly cool the electrolytes.

[Cooling Mechanism]

The RF battery 1 is equipped with a cooling mechanism for cooling the heat exchangers 10 and 11 to remove the heat from the electrolytes of the respective electrodes and thereby cool the electrolytes. Examples of the cooling mechanism include a forced cooling mechanism such as a water cooling mechanism that uses cooling water to cool the electrolytes and an air cooling mechanism that involves blowing air. According to the water cooling mechanism, the heat exchangers 10 and 11 are placed in containers and cooling water is supplied to (circulated in) the containers. The water cooling mechanism offers superior electrolyte cooling performance compared to the air cooling mechanism. The air cooling mechanism may use fans. In such a case, cooling water is obviously not necessary and components such as pumps for supplying (circulating) cooling water and a device for cooling the cooling water are not necessary. Thus, the cooling mechanism can be miniaturized and simplified compared to the water cooling mechanism. In this embodiment, the cooling mechanism is constituted by fans 20 and 21. The installation sites of the fans 20 and 21 may be any sites from which air can be applied to substantially all parts of the heat exchangers 10 and 11.

[Bypass Flow Channels]

Bypass flow channels 30 and 31 connect the electrolyte inflow side to the electrolyte outflow side of the heat exchangers 10 and 11 so as to bypass the heat exchangers 10 and 11. In other words, the bypass flow channels 30 and 31 are installed in the circulation channels and constitute part of the circulation channels. Here, the inlets of the bypass flow channels 30 and 31 are respectively connected to the upstream outflow channels 110$u$ and 111$u$ and the outlets of the bypass flow channels are respectively connected to the downstream outflow channels 110$d$ and 111$d$. When the electrolytes flow through the bypass flow channels 30 and 31, the electrolytes flowing through the bypass flow channels 30 and 31 are not cooled by the heat exchangers 10 and 11. If cooling of the electrolytes is to be suppressed, the electrolytes can be made to flow through the bypass flow channels 30 and 31 so as to prevent further cooling. Thus, the temperatures of the electrolytes are easier to control and overcooling of the electrolytes is suppressed. The bypass flow channels 30 and 31 can be formed of ducts having the same diameters as those of the outflow channels 110 and 111 to which they are connected. Examples of the material for the ducts constituting the bypass flow channels 30 and 31 include the same resin (PVC) as those constituting the outflow channels 110 and 111. The electrolytes are caused to flow through the bypass flow channels 30 and 31 by using the flow rate variable mechanism.

[Flow Rate Variable Mechanism]

The flow rate variable mechanism is capable of varying the flow rates of the electrolytes flowing through the heat exchangers 10 and 11 and the flow rates of the electrolytes flowing through the bypass flow channels 30 and 31. Examples of the flow rate variable mechanism include valves that open and close flow channels and valves that select flow channels into which the electrolyte flow and that adjust the flow rate for each flow channel. Examples of the valves that open and close the flow channels include gate valves, globe valves, ball valves, butterfly valves, and diaphragm valves equipped with valving elements. Examples of the valves that select flow channels into which the electrolyte flow and that adjust the flow rate for each flow channel include three-way valves equipped with selector valves. By switching the selector valves of the three-way valves, the flow channels (bypass flow channels 30 and 31) on the heat exchanger-10-and-11 side can open (completely open) and bypass flow channels 30 and 31 (flow channels on the heat exchanger-10-and-11 side) can be closed (completely closed) to select the flow channels into which the electrolytes flow. As a result, the electrolytes are caused to flow into the heat exchangers 10 and 11 only or the bypass flow channels 30 and 31 only. By adjusting the degrees of opening of the selector valves, the electrolytes can be caused to flow into both flow channels while controlling the flow rates (valve opening degrees) for the respective flow channels.

The installation site of the flow rate variable mechanism is, for example, (1) bypass flow channels 30 and 31 or (2) near the inlet or outlet of each of the heat exchangers 10 and 11 and the bypass flow channels 30 and 31, if valves that open and close the flow channels are to be used. The site near the inlet of each of the heat exchangers 10 and 11 refers to positions in the upstream outflow channels 110$u$ and 111$u$ that are on the heat exchanger-10-and-11 side of the connection points between the outflow channels and the bypass flow channels 30 and 31. The site near the outlet of each of the heat exchangers 10 and 11 refers to positions in the downstream outflow channels 110$d$ and 111$d$ that are on the heat exchanger-10-and-11 side of the connection points between the outflow channels and the bypass flow channels 30 and 31.

When the valves are installed only in the bypass flow channels 30 and 31 and the valving elements are operated to open the valves, a large proportion of the electrolytes flow into the bypass flow channels 30 and 31 although some electrolytes may also flow into the heat exchangers 10 and 11. When the valves are closed, the electrolytes flow into the heat exchangers 10 and 11 only. The pressure loss in the bypass flow channels 30 and 31 is small compared to the heat exchangers 10 and 11; thus, opening the valves causes a large proportion of the electrolytes to flow into the bypass flow channels 30 and 31. In such a case, the large proportion of the electrolytes flow through the bypass flow channels 30 and 31 and are not cooled by the heat exchangers 10 and 11. Thus, even if some of the electrolytes are cooled as they flow through the heat exchangers 10 and 11, the temperatures of the electrolytes as a whole are not likely to drop to a level that affects the battery performance despite the low temperature of the some of the electrolytes. By adjusting the opening degree of the valves, the flow rates of the electrolyte that flows into the bypass flow channels 30 and 31 and the flow rates of the electrolyte that flows into the heat exchangers 10 and 11 can be adjusted.

When valves are installed at the inlets or outlets of the heat exchangers 10 and 11 and at the bypass flow channels 30 and 31 and when the valves near the inlets or outlets of the heat exchangers 10 and 11 are opened and the valves at the bypass flow channels 30 and 31 are closed, the electrolytes are caused to flow through the heat exchangers 10 and 11. Conversely, when the valves near the inlets or outlets of the heat exchangers 10 and 11 are closed and the valves at the bypass flow channels 30 and 31 are opened, the electrolytes are cause to flow through the bypass flow channels 30 and 31. If all valves are opened (or the opening degrees of the valving elements of all valves are adjusted), the electrolytes can be caused to flow through all of the heat exchangers 10 and 11 and the bypass flow channels 30 and 31.

When the valves (for example, three-way valves) that select the flow channels and adjust the flow rates for the respective flow channels are used, examples of the installation site of the flow rate variable mechanism include the connecting points between the bypass flow channels 30 and 31 and the circulation channels. In such a case, the opening degrees of the selector valves are adjusted so as to select the flow channels and adjust the flow rates for the respective flow channels.

In this embodiment, the flow rate variable mechanism is formed of butterfly valves 40 to 43 installed near the inlets of the heat exchangers 10 and 11 and in the bypass flow channels 30 and 31, respectively. The control mechanism 50 controls the flow rate variable mechanism to vary the flow rates of the electrolytes flowing through the heat exchangers 10 and 11 and the bypass flow channels 30 and 31, in other words, to operate the valving elements of the butterfly valves 40 to 43. The butterfly valves 40 to 43 controlled by the control mechanism 50 can continuously vary the flow rates of the electrolytes. The opening/closing of the butterfly valves 40 and 41 near the inlets of the heat exchangers 10 and 11 and the opening/closing of the butterfly valves 42 and 43 in the bypass flow channels 30 and 31 can be coordinated by using the control mechanism 50.

[Control Mechanism]

The control mechanism 50 includes a measurement sensor that measures physical quantities related to the temperatures of the electrolytes and a control unit 54 that includes a flow rate controller 540 that controls the flow rate of the electrolyte that flows into the heat exchangers 10 and 11 and the flow rate of the electrolyte that flows into the bypass flow channels 30 and 31 by using the butterfly valves (flow rate variable mechanism) 40 to 43 on a basis of the results obtained from the measurement sensor. The flow rates are controlled in two ways: causing the electrolytes to flow through the heat exchangers 10 and 11 only or the bypass flow channels 30 and 31 only; and causing the electrolytes to flow into the respective flow channels at desired flow rates. In this embodiment, the former, i.e., causing the electrolytes to flow through the heat exchangers only or the bypass flow channels only, is described. The latter case of causing the electrolytes to flow at desired flow rates is described in Embodiment 2. The control unit 54 may also include at least one selected from a cooling controller 541 that controls operation of the cooling mechanisms 20 and 21 on a basis of the measurement results obtained from the measurement sensor and a pump controller 542 that controls output of the pumps 112 and 113. The flow rate controller 540, the cooling controller 541, and the pump controller 542 may be controlled by one control unit 54 or by independent different controllers, respectively. The cooling controller 541 and the pump controller 542 are described below in Embodiment 3 and Embodiment 4.

(Measurement Sensor)

The physical quantities related to the temperatures of the electrolytes measured by the measurement sensor naturally include the temperature of the electrolyte and also physical quantities that are correlated with the electrolyte temperature. Examples of the physical quantities that have the correlation include ambient temperature etc. If the ambient temperature is low (high), then the temperature of the electrolyte is low (high). In other words, liquid temperature sensors 51 and 52 (illustrated in solid lines in FIG. 1) that can measure the liquid temperature and/or an air temperature sensor 53 (illustrated in two-dot broken lines in FIG. 1) that can measure the ambient temperature is preferably used as the measurement sensor. The liquid temperature sensors 51 and 52 can measure accurate temperatures of the electrolytes in real time.

Thus, the flow rates can be accurately controlled by the flow rate controller 540, the temperatures of the electrolytes can be easily adjusted, and overcooling of the electrolytes is effectively suppressed. With the air temperature sensor 53, the temperatures of the electrolytes are easily controlled. This is because changes in ambient temperature readily affect changes in temperatures of the electrolytes and have a strong correlation with the temperatures of the electrolytes. Moreover, it has simpler arrangement and structure than the sensors that directly measure the temperatures of the electrolytes, such as the liquid temperature sensors 51 and 52. When the air temperature sensor 53 is used, the number of the air temperature sensor 53 may be 1. When all of the liquid temperature sensors 51 and 52 and the air temperature sensor 53 are provided, the physical quantities can still be measured in the event that one of the sensors malfunctions and the physical quantities cannot be measured, by using the rest of the sensors. Commercially available sensors can be used as the sensors 51 to 53.

For the sensors, such as the liquid temperature sensors 51 and 52, that directly measure the temperatures of the electrolytes, the installation sites of the measurement sensors may be any sites upstream (in the upstream outflow channels 110$u$ and 111$u$) or downstream (in the downstream outflow channels 110$d$ and 111$d$) of the heat exchangers 10 and 11 in the circulation channels although this also depends on the control operation of the flow rate controller 540. When the liquid temperature sensors 51 and 52 are installed upstream of the heat exchangers 10 and 11, the flow rates of the electrolytes flowing through the heat exchangers 10 and 11 and the bypass flow channels 30 and 31 can be controlled on the basis of the temperatures of the electrolytes that have passed through the battery cell 100; hence, adjustment is done appropriately and easily. When the liquid temperature sensors 51 and 52 are installed downstream of the heat exchangers 10 and 11, the flow rates of the electrolytes flowing through the heat exchangers 10 and 11 and the bypass flow channels 30 and 31 can be controlled on the basis of the temperatures of the electrolytes after passing through and being cooled by the heat exchangers 10 and 11; thus, the electrolytes are easily prevented from becoming unnecessarily cooled. Moreover, since the flow rates can be adjusted on the basis of the temperatures of the electrolytes that flow through the bypass flow channels 30 and 31 and that are not cooled by the heat exchangers 10 and 11, the electrolytes whose temperatures have increased as a result of battery reaction are easily prevented from elevating to an unnecessarily high temperature. Thus, the temperatures of the electrolytes can be efficiently adjusted.

The installation sites of the measurement sensors may be near the upstream or downstream side of the heat exchangers 10 and 11 in the circulation channels when the sensors do not directly measure the temperatures of the electrolytes, as with the air temperature sensor 53. This is because the correlation with the temperatures of the electrolytes tend to be strong.

In this embodiment, the measurement sensor includes the liquid temperature sensors 51 and 52, which measure the temperatures of the electrolytes, and the liquid temperature sensors 51 and 52 are installed in the upstream outflow channels 110$u$ and 111$u$ upstream of the connecting positions between the outflow channels and the bypass flow channels 30 and 31. The measurement results obtained from the liquid temperature sensors (measurement sensor) 51 and 52 are transmitted to the control unit 54 (flow rate controller 540).

(Flow Rate Controller)

The flow rate controller 540 controls the flow rates of the electrolyte that flows into the heat exchangers 10 and 11 and the flow rates of the electrolyte that flows into the bypass flow channels 30 and 31 by using the butterfly valves (flow rate variable mechanism) 40 to 43 on the basis of the measurement results obtained from the liquid temperature sensors (measurement sensor) 51 and 52. As a result, the temperatures of the electrolytes can be controlled to be within the desired temperature ranges. For example, the flow rate controller 540 may include a data input unit that receives the measurement results from the liquid temperature sensors 51 and 52, a judgment unit that judges the results by comparing them with the threshold, and a command output unit that outputs an operation command to motors that drive valving elements of the butterfly valves 40 to 43 on the basis of the results of the judgment unit (all of these are omitted from the drawings). The details of how the flow rates are controlled are described below.

(Control Procedure)

Figure 2:
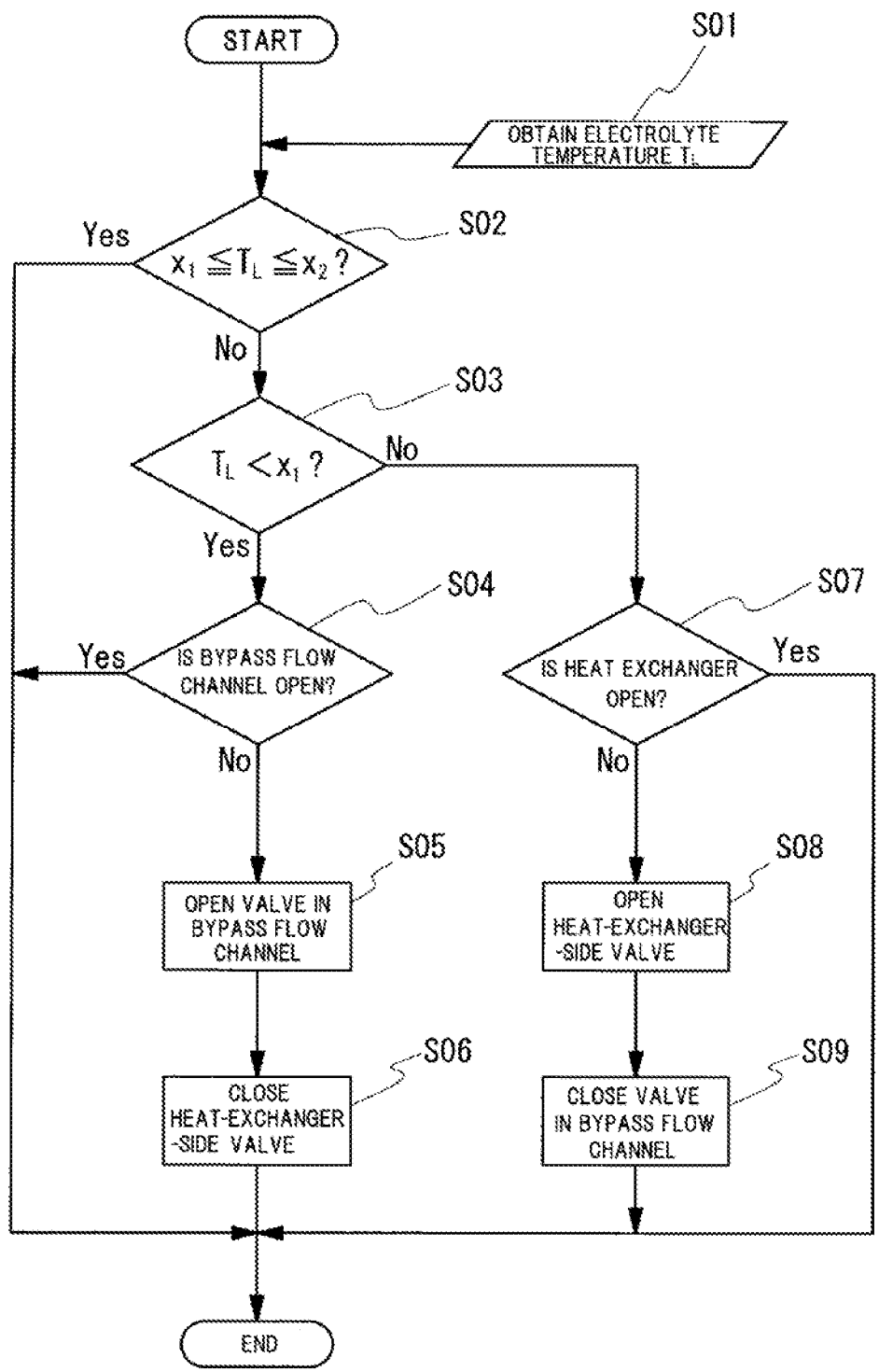
FIG. 2 is a flowchart illustrating an electrolyte temperature controlling procedure for a redox flow battery according to Embodiment 1.

The procedure of controlling the valving elements of the butterfly valves (flow rate variable mechanism) 40 to 43 by using the control mechanism 50 will now be described with reference to the flowchart in FIG. 2. First, the temperatures of the electrolytes of the respective electrodes are measured with the liquid temperature sensors (measurement sensor) 51 and 52 to obtain electrolyte temperatures $T_L$ of the respective electrodes (step S01). Next, the flow rate controller 540 judges whether the obtained electrolyte temperatures $T_L$ satisfy the set temperature range of $x_1$ (° C.) or higher and $x_2$ (° C.) or lower (step S02). If this condition is satisfied, the valving elements of the butterfly valves 40 to 43 stay as they are and the control procedure is ended.

When the condition is not satisfied, whether the electrolyte temperatures $T_L$ is less than the lower limit $x_1$ (° C.) is judged (step S03). If this condition is satisfied, whether the bypass flow channels 30 and 31 are open is judged (step S04). When the bypass flow channels 30 and 31 are open, the valving elements of the butterfly valves 40 to 43 remain as are and the control procedure is ended.

If the bypass flow channels 30 and 31 are closed, the valving elements of the butterfly valves 42 and 43 in the bypass flow channels 30 and 31 are opened (step S05). The valving elements of the butterfly valves 40 and 41 on the heat exchanger-10-and-11 side are closed (step S06). These steps S05 and S06 may be performed at the same time. Subsequently, the valving elements of the butterfly valves 40 to 43 remain as are and the control procedure is ended.

If the condition in step S03 is not satisfied, in other words, if the electrolyte temperatures $T_L$ are higher than the upper limit $x_2$ (° C.), whether the heat exchangers 10 and 11 are open is judged (step S07). If the heat exchangers 10 and 11 are open, the valving elements of the butterfly valves 40 to 41 remain as are and the control procedure is ended.

If the heat exchangers 10 and 11 are closed, the valving elements of the butterfly valves 40 and 41 on the heat exchanger-10-and-11 side are opened (step S08). The valving elements of the butterfly valves 42 and 43 in the bypass flow channels 30 and 31 are closed (step S09). The steps S08 and S09 may be performed at the same time as with the steps S05 and S06. Then the valving elements of the butterfly valves 40 to 43 remain as are and the control procedure is ended.

The steps S01 to S09 are repeated at regular intervals using a timer. Naturally, the steps S01 to S09 may be continuously repeated without ending the control procedure.

[Electrolyte]

Figure 5:
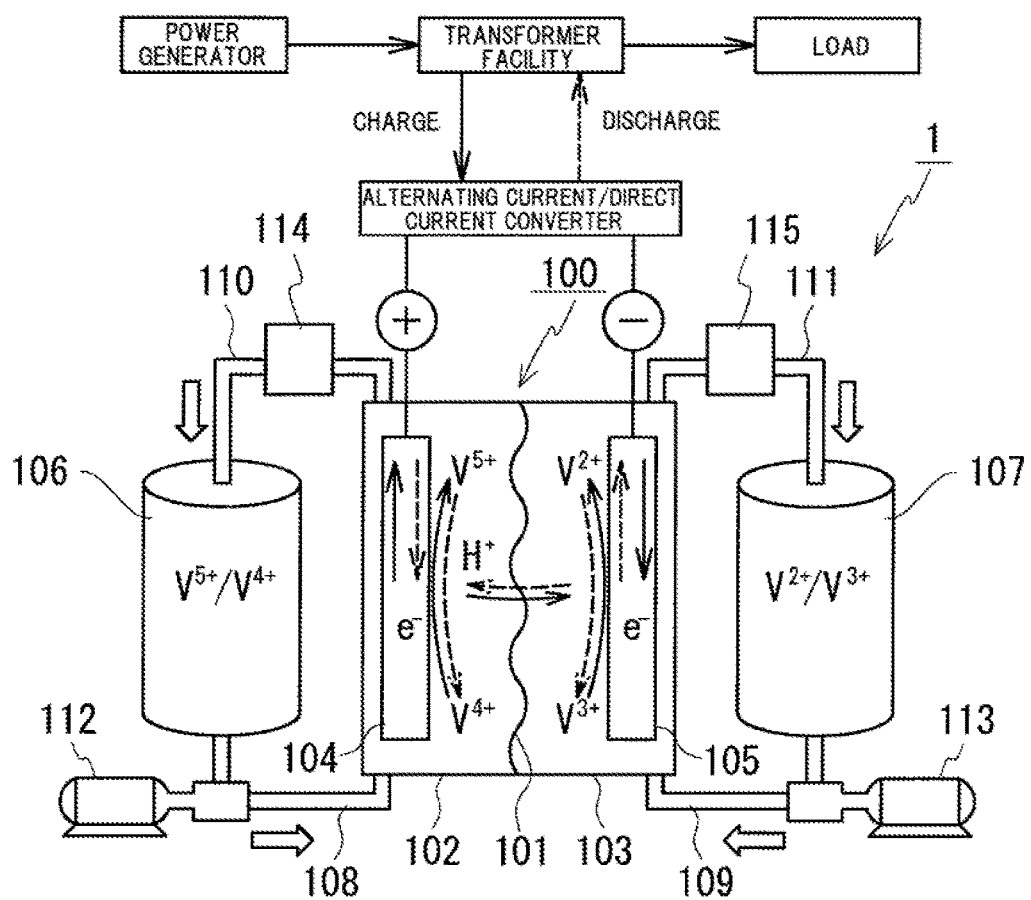
FIG. 5 is an operation principle diagram of a redox flow battery.

Aqueous vanadium ion solutions are used as the electrolytes of the respective electrodes as illustrated in FIG. 5. However, the electrolytes are not limited to the aqueous vanadium ion solutions. Examples of the possible combinations of the electrolytes of the respective electrodes are as follows: (1) a positive electrode electrolyte containing a manganese ion and a negative electrode electrolyte containing at least one metal ion selected from a titanium ion, a vanadium ion, a chromium ion, a zinc ion, and a tin ion; (2) a positive electrode electrolyte containing a manganese ion and a titanium ion and a negative electrode electrolyte containing at least one metal ion selected from a titanium ion, a vanadium ion, a chromium ion, a zinc ion, and a tin ion; (3) a positive electrode electrolyte and a negative electrode electrolyte each containing both a manganese ion and a titanium ion; and (4) a positive electrode electrolyte containing an iron ion and a negative electrode electrolyte containing at least one metal ion selected from a titanium ion, a vanadium in, a chromium ion, a zinc ion, and a tin ion.

A solvent for the electrolyte may be at least one aqueous solution selected from $H_2SO_4$, $K_2SO_4$, $Na_2SO_4$, $H_3PO_4$, $H_4P_2O_7$, $K_2HPO_4$, $Na_3PO_4$, $K_3PO_4$, $HNO_3$, $KNO_3$, $HCl$, and $NaNO_3$. In particular, an aqueous solution containing a sulfate anion ($SO_4^{2-}$) is useful.

[Description of Other Features]

Figure 3:
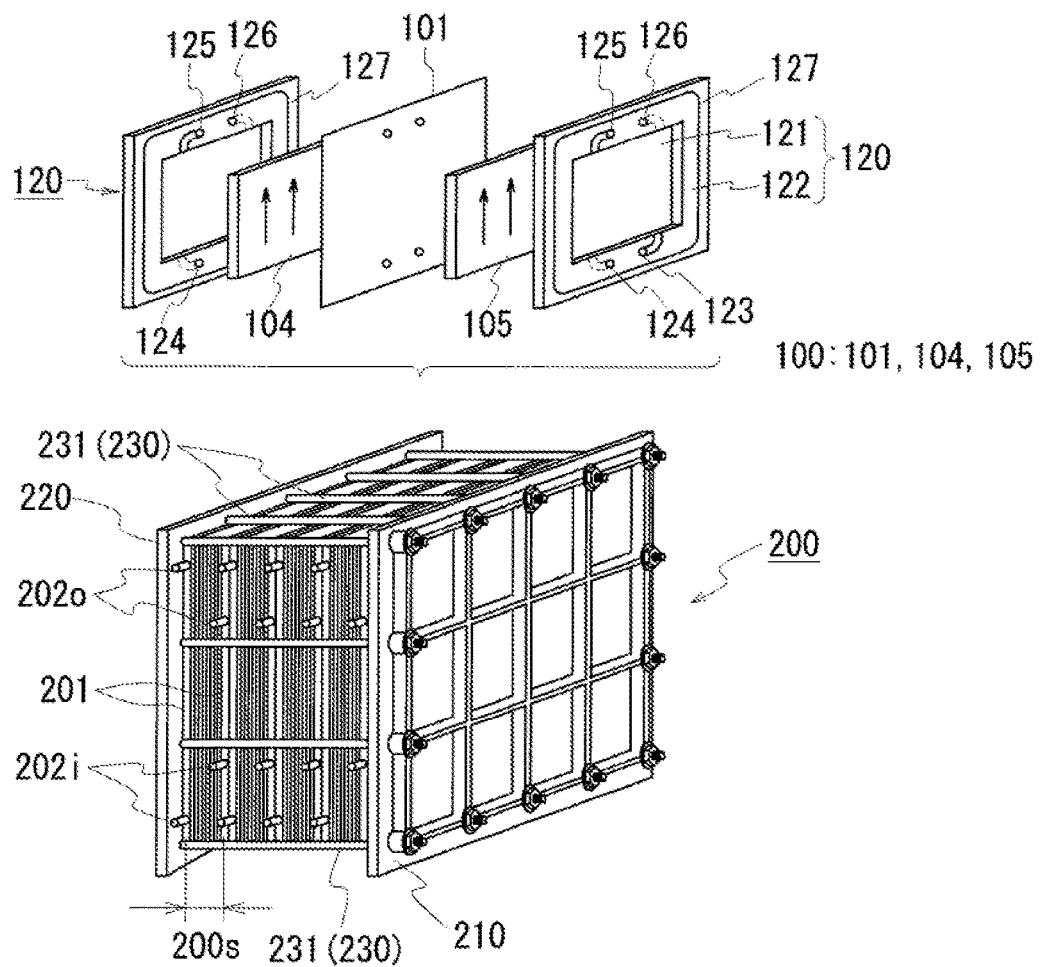
FIG. 3 is a schematic diagram of a cell stack included in the redox flow battery according to Embodiments 1 to 4.

Referring to FIG. 3, the RF battery 1 includes a cell stack 200 constituted by a stack of multiple sub-cell stacks 200$s$ each including multiple battery cells 100. The cell stack 200 is formed by clamping two sides of the stack of the sub-cell stacks 200$s$ with two end plates 210 and 220 by using a clamping mechanism 230. The clamping mechanism 230 is formed of, for example, clamping shafts 231, nuts (not illustrated in the drawing) fastened at both ends of each clamping shaft 231, and compressed springs (not illustrated in the drawing) between the nuts and the endplate 210.

Each of the sub-cell stacks 200$s$ includes a stack body formed by stacking a cell frame 120, which includes a bipolar plate 121 and a frame 122 supporting an outer peripheral edge of the bipolar plate 121, a positive electrode 104, a membrane 101, and a negative electrode 105 in that order. According to this structure, one battery cell 100 is formed between bipolar plates 121 of each two adjacent cell frames 120. Each of the sub-cell stacks 200$s$ further includes a pair of current collecting plates disposed at both sides of the stack and a pair of inflow/outflow plates 201 disposed at both sides of the pair of the current colleting plates. The current collecting plates are connected to the bipolar plates 121 located at both ends of the stack in the stacking direction. Each current collecting plate has a terminal protruding outward from the peripheral edge of the current collecting plate between the pair of the inflow/outflow plates 201 (between the inflow/outflow plate 201 and the bipolar plate 121 at an end). Input and output of power between the battery cell 100 of the sub-cell stack 200s and an external device is performed through this terminal.

Each of the inflow/outflow plates 201 includes an inflow pipe 202i connected to the inflow channel 108 (109) illustrated in FIG. 1 and an outflow pipe 202o connected to the outflow channel 110 (111). The electrolytes flow between the sub-cell stacks 200s and the tanks 106 and 107 through these pipes 202i and 202o.

The electrolytes flow through the sub-cell stacks 200s through inflow manifolds 123 and 124 and outflow manifolds 125 and 126 formed in the frame 122. The positive electrode electrolyte flows into the positive electrode 104 through a groove formed in one surface (front side with respect to the plane of the paper of the drawing) of the frame 122 from the inflow manifold 123 and flows out into the outflow manifold 125 through a groove formed in an upper portion of the frame 122. Similarly, the negative electrode electrolyte flows into the negative electrode 105 through a groove formed in the other side (rear side with respect to the plane of the paper of the drawing) of the frame 122 from the inflow manifold 124 and flows out into the outflow manifold 126 through a groove formed in an upper portion of the frame 122. A ring-shaped seal member 127, such as an O ring or a flat packing, is disposed between each two frames 122 to prevent leaking of the electrolytes from the sub-cell stacks 200s.

[Advantages and Effects]

The RF battery 1 according to Embodiment 1 has the following effects.

(1) Since the heat exchangers 10 and 11 are provided, the electrolytes can be cooled by the heat exchangers 10 and 11 when the temperatures of the electrolytes tend to rise, such as during the summer time.

(2) Since the bypass flow channels 30 and 31 that bypass the heat exchangers 10 and 11, and the butterfly valves 40 to 43 are provided, overcooling of the electrolytes can be suppressed when the temperatures of the electrolytes tend to drop, such as during the winter time. This is because the electrolytes can be caused to flow through the bypass flow channels 30 and 31 and the electrolytes flowing through the bypass flow channels 30 and 31 are not cooled by the heat exchangers 10 and 11. In particular, in an environment in which the gap between the highest temperature and the lowest temperature is large and the electrolytes are tend to be overcooled, overcooling of the electrolytes can be prevented even during the winter time.

(3) Since the electrolytes can be cooled while excessive drop in the electrolyte temperatures caused by overcooling is suppressed, the temperatures of the electrolytes can be easily adjusted. Thus, the charge-discharge reactions can be promoted and the battery performance can be enhanced.

(4) Since the excessive drop of the temperatures of the electrolytes can be suppressed, the increase in viscosity of the electrolytes can be suppressed and the increase in pressure loss can be suppressed. When the electrolytes are caused to flow through the bypass flow channels 30 and 31 without flowing through the heat exchangers 10 and 11, the pressure loss can be decreased.

[Embodiment 2]

In Embodiment 1, an embodiment in which the electrolytes are caused to flow through either the heat exchangers 10 and 11 or the bypass flow channels 30 and 31 only by opening and closing valving elements of the butterfly valves (flow rate variable mechanism 40 to 43 by using the flow rate controller 540 has been described. In Embodiment 2, an embodiment in which the electrolytes are allowed to flow through all of the heat exchangers 10 and 11 and the bypass flow channels 30 and 31 at desired flow rates is described. Specifically, the flow rate controller 540 adjusts the opening degrees of the valving elements of the butterfly valves 40 to 43 so as to adjust the flow rates of the electrolytes flowing through the heat exchangers 10 and 11 and the bypass flow channels 30 and 31. The features other than the procedure of controlling the butterfly valves 40 to 43 by using the flow rate controller 540 are the same as in Embodiment 1. Thus, in the description below, the control procedure is described.

(Control Procedure)

Figure 4:
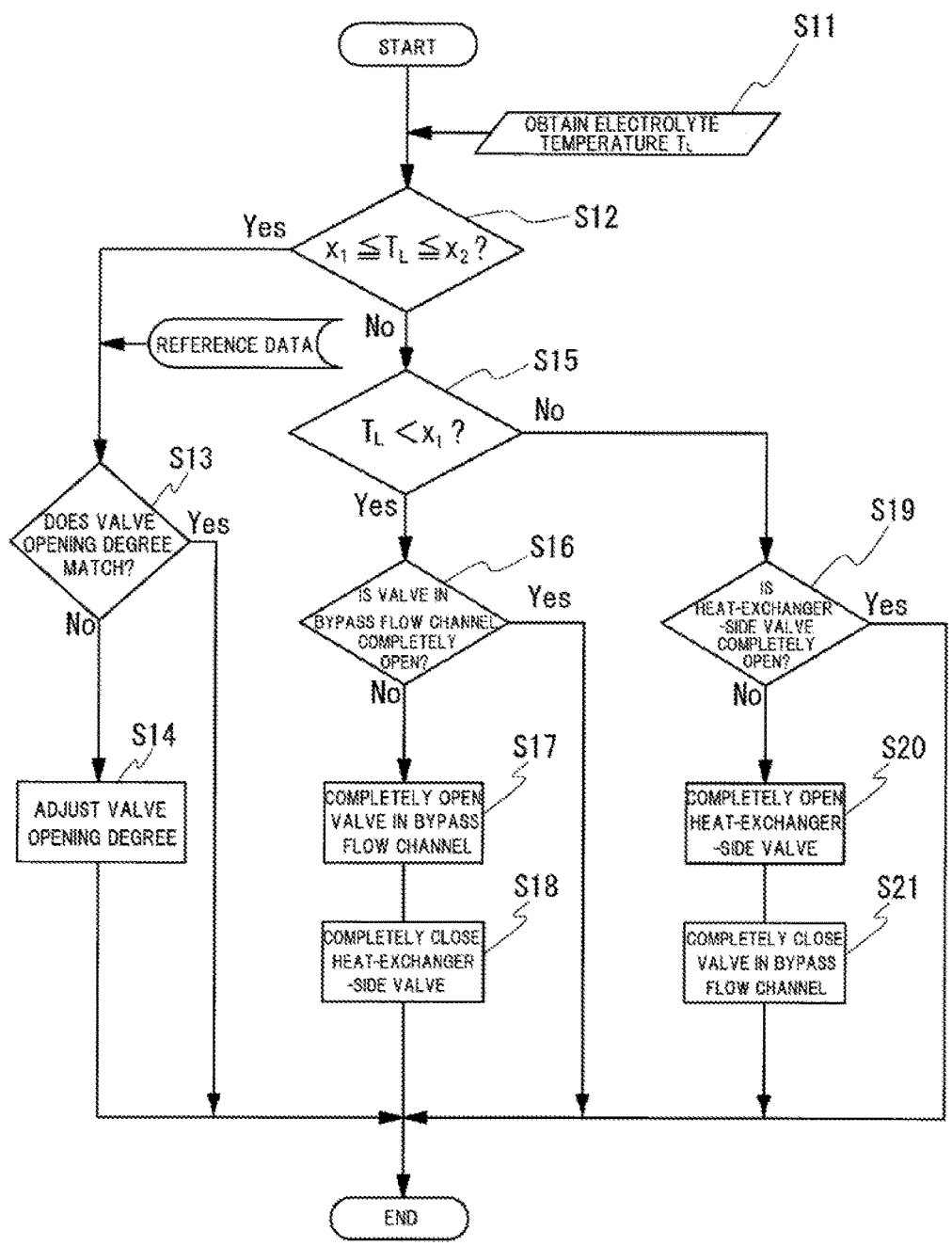
FIG. 4 is a flowchart illustrating an electrolyte temperature control procedure for a redox flow battery according to Embodiment 2.

The procedure of controlling the butterfly valves (flow rate variable mechanism) 40 to 43 by using the control mechanism 50 will now be described with reference to the flowchart in FIG. 4. Steps S11 to S12 are the same as the steps S01 to S02 of Embodiment 1.

If the electrolyte temperatures $T_L$ (° C.) satisfy the set temperature range of $x_1$ (° C.) or higher and $x_2$ (° C.) or lower in the step S12, the preliminarily stored reference data is called and whether the opening degree of the bypass flow channel (heat exchanger) at the electrolyte temperature $T_L$ in the reference data matches the opening degrees of the bypass flow channels 30 and 31 (heat exchangers 10 and 11) presently observed is judged (step S13).

Preliminarily, the correlation data of the opening degrees of the bypass flow channel (heat exchanger) with respect to the electrolyte temperature $T_L$ is determined and this correlation data is used as the reference data. For example, the opening degrees of the valving elements of the butterfly valves 42 and 43 in the bypass flow channels 30 and 31 are set to 100% (completely open) and the opening degrees of the valving elements of the butterfly valves 40 and 41 on the heat exchanger-10-and-11 side are set to 0% (completely closed) when the temperature is lower than the lower limit $x_1$. Moreover, the opening degrees of the valving elements of the butterfly valves 42 and 43 in the bypass flow channels 30 and 31 are set to 0% (completely closed) and the opening degrees of the valving elements of the butterfly valves 40 and 41 on the heat exchanger-10-and-11 side are set to 100% (completely open) when the temperature is higher than the upper limit $x_2$. Then the opening degrees are set according to the temperature within the set temperature ranges. In other words, as the temperature approaches the lower limit $x_1$, the opening degrees of the butterfly valves 42 and 43 in the bypass flow channels 30 and 31 are increased and the opening degrees of the butterfly valves 40 and 41 on the heat exchanger-10-and-11 side are decreased. Conversely, as the temperature approaches the upper limit $x_2$, the opening degrees of the butterfly valves 42 and 43 of the bypass flow channels 30 and 31 are decreased and the opening degrees of the flow channels of the butterfly valves 40 and 41 on the heat exchanger-10-and-11 side are increased.

If the judgment result matches the opening degree determined from the reference data in the step S13, the valving elements of the butterfly valves 40 to 43 remain as are and the control procedure is ended. If the judgment result does not match, the opening degrees of the bypass flow channels 30 and 31 are controlled to match the opening degree of the reference data by controlling the opening degrees of the valving elements of the butterfly valves 40 to 43 and thereby controlling the flow rates of the electrolytes flowing through the heat exchangers 10 and 11 and the bypass flow channels 30 and 31 (step S14). The valving elements of the butterfly valves 40 to 43 remain as are and the control procedure is ended.

If the set temperature range is not satisfied in step S12, whether the electrolyte temperature $T_L$ is lower than the lower limit $x_1$ is judged (step S15) as in the step 03 of Embodiment 1. If this condition is satisfied, whether the valving elements of the butterfly valves 42 and 43 in the bypass flow channels 30 and 31 are completely open is judged (step S16). If the valving elements of the butterfly valves 42 and 43 in the bypass flow channels 30 and 31 are completely open, the valving elements of the butterfly valves 40 to 43 remain as are and the control procedure is ended. In contrast, if the valving elements of the butterfly valves 42 and 43 in the bypass flow channels 30 and 31 are not completely open, the valving elements of the butterfly valves 42 and 43 in the bypass flow channels 30 and 31 are completely opened (step S17). The valving elements of the butterfly valves 40 and 41 on the heat exchanger-10-and-11 side are completely closed (step S18). These steps S17 and S18 may be performed simultaneously. Then the butterfly valves 40 to 43 remain as are and the control procedure is ended.

If the preset condition is not satisfied in the step S15, in other words, if the electrolyte temperature $T_L$ exceeds the upper limit $x_2$, whether the valving elements of the butterfly valves 40 and 41 on the heat exchanger-10-and-11 side are completely open is judged (step S19). If the valving elements of the butterfly valves 40 and 41 on the heat exchanger-10-and-11 side are completely open, the butterfly valves 40 to 43 remain as are and the control procedure is ended. Contrary, if the valving elements of the butterfly valves 40 and 41 on the heat exchangers-10-and-11 side are not completely open, the valving elements of the butterfly valves 40 and 41 on the heat exchanger-10-and-11 side are completely opened (step S20). The valving elements of the butterfly valves 42 and 43 in the bypass flow channels 30 and 31 are completely closed (step S21). These steps S20 and S21 may be performed at the same time as with the steps S17 and S18. Then the butterfly valves 40 to 43 remain as are and the control procedure is ended.

As in Embodiment 1, steps S11 to S21 are repeated at regular intervals using a timer. Naturally, these steps may be continuously repeated without ending control.

[Advantages and Effects]

The RF battery 1 according to Embodiment 2 can highly accurately control the temperatures of the electrolytes since the flow rates of the electrolytes flowing through the heat exchangers 10 and 11 and the bypass flow channels 30 and 31 are adjusted by adjusting the opening degrees of the valving elements of the butterfly valves 40 to 43 according to the temperatures of the electrolytes.

[Embodiment 3]

In Embodiment 3, the flow of the electrolyte can be switched between the heat exchangers 10 and 11 and the bypass flow channels 30 and 31 on the basis of the measurement results obtained from the measurement sensor as in Embodiment 1; in addition, the operation of the cooling mechanisms 20 and 21 can be controlled by using the cooling controller 541 of the control mechanism 50. In this embodiment, as in Embodiment 1, fans 20 and 21 are used as the cooling mechanism, the butterfly valves 40 to 43 are used as the flow rate variable mechanism, and the liquid temperature sensors 51 and 52 are used as the measurement sensor.

(Cooling Controller)

The operation of the fans 20 and 21 is controlled by the cooling controller 541 on the basis of the measurement results obtained from the liquid temperature sensors 51 and 52, as described above. In other words, the operation is controlled in coordination with the control of the butterfly valves 40 to 43 by the flow rate controller 540. Specifically, when the electrolytes are to flow through the heat exchangers 10 and 11 without flowing through the bypass flow channels 30 and 31, the fans 20 and 21 are driven by the cooling controller 541. When the electrolytes are to flow through the bypass flow channels 30 and 31 without flowing through the heat exchangers 10 and 11, the fans 20 and 21 are stopped by the cooling controller 541. These operations controlled by the cooling controller 541 may be performed simultaneously with the control by the flow rate controller 540 described above or before or after the control by the flow rate controller 540. The cooling controller 541 may be equipped with a circuit that outputs a command based on the results of the liquid temperature sensors 51 and 52 to the driving unit (motor) of the finis 20 and 21, for example.

[Advantages and Effects]

The RF battery 1 of Embodiment 3 can stop the fans 20 and 21 in coordination with the flow of the electrolytes through the bypass flow channels 30 and 31. When the cooling of the electrolytes is suppressed by causing the electrolytes to flow through the bypass flow channels 30 and 31, the fans 20 and 21 can be stopped as such and thus power can be saved.

[Embodiment 4]

In Embodiment 4, the flow of the electrolyte can be switched between the heat exchangers 10 and 11 and the bypass flow channels 30 and 31 on the basis of the measurement results obtained from the measurement sensor as in Embodiment 1; furthermore, the outputs of the pumps 112 and 113 can be controlled by the pump controller 542 of the control mechanism 50. In this embodiment, as in Embodiment 1, fans 20 and 21 are used as the cooling mechanism, the butterfly valves 40 to 43 are used as the flow rate variable mechanism, and the liquid temperature sensors 51 and 52 are used as the measurement sensor.

(Pump Controller)

The outputs of the pumps 112 and 113 are controlled by the pump controller 542 on the basis of the measurement results obtained from the liquid temperature sensors 51 and 52 as described above. In other words, the outputs are controlled in coordination with the control of the butterfly valves 40 to 43 by the flow rate controller 540. Specifically, when the electrolytes are to flow through the heat exchangers 10 and 11 without flowing through the bypass flow channels 30 and 31, the outputs of the pumps 112 and 113 are increased compared to when the electrolytes are to flow through the bypass flow channels 30 and 31 without flowing through the heat exchangers 10 and 11. When the electrolytes are to flow through the bypass flow channels 30 and 31 without flowing through the heat exchangers 10 and 11, the outputs of the pumps 112 and 113 are decreased by the pump controller 542 compared to when the electrolytes are to flow through the heat exchangers 10 and 11 without flowing through the bypass flow channels 30 and 31. The control of the outputs by the pump controller 542 is performed at the same time or after the control by the flow rate controller 540. The pump controller 542 may be equipped with a circuit that outputs a command on the basis of the measurement results obtained from the liquid temperature sensors 51 and 52 to the motors of the pumps 112 and 113, for example.

[Advantages and Effects]

According to the RF battery 1 of Embodiment 4, the outputs of the pumps 112 and 113 can be decreased by causing the electrolytes to flow through the bypass flow channels 30 and 31 without flowing through the heat exchangers 10 and 11 compared to when the electrolytes are all caused to flow through the heat exchangers 10 and 11. Since the outputs of the pumps can also be decreased in coordination with the flow of the electrolytes through the bypass flow channels, the outputs of the pumps 112 and 113 can be optimized to the lowest possible level, which contributes to saving energy. According to the RF battery 1 of Embodiment 4, further saving energy can be achieved if the outputs of the cooling mechanism 20 and 21 are controlled on the basis of the measurement results obtained from the measurement sensor as in Embodiment 3.

MODIFICATION EXAMPLE 1

As described above, the air temperature sensor 53 that measures the ambient temperature can be used as the measurement sensor. In such a case, the correlation data showing the correlation between the ambient temperature and the electrolyte temperature is used as the reference data. On the basis of the measured ambient temperature obtained from the air temperature sensor 53, the flow rate controller 540 controls the butterfly valves (flow rate variable mechanism) 40 to 43 to control the flow rates of the electrolyte that flows into the heat exchangers 10 and 11 and the flow rates of the electrolyte that flows into the bypass flow channels 30 and 31. Specifically, the butterfly valves 40 to 43 are opened and closed by referencing the measured ambient temperature with the reference data so that the electrolytes are caused to flow to either the heat exchangers 10 and 11 or the bypass flow channels 30 and 31 only. Alternatively, the opening degrees of the valving elements of the butterfly valves 40 to 41 are adjusted so that the electrolytes flow through the respective flow channels at desired flow rates.

MODIFICATION EXAMPLE 2

The cooling mechanism may be a water cooling mechanism, as described above. In this case, the cooling mechanism includes, for example, containers that house heat exchangers, cooling water that cools the heat exchangers in the containers, and a supplying (circulating) mechanism that supplies (circulates) the cooling water to the containers. On the basis of the measurement results obtained from the liquid temperature sensors (measurement sensor) 51 and 52, the flow of the electrolytes may be switched between the heat exchangers 10 and 11 and the bypass flow channels 30 and 31 as in Embodiment 3 and the operation of the cooling mechanism is controlled. Specifically, when the measurement results obtained from the liquid temperature sensors 51 and 52 are lower than the lower limit $x_1$ (° C.), the flow rate controller 540 causes the electrolytes to flow through the bypass flow channels 30 and 31 without allowing the electrolytes to flow through the heat exchangers 10 and 11. For example, the flow rate of the cooling water supplied (circulated) to the container is decreased or the supply (circulation) itself is stopped in coordination thereto, for example.

MODIFICATION EXAMPLE 3

Examples of the physical quantities related to the electrolyte temperatures measured with the measurement sensor include, in addition to the liquid temperature and the ambient temperature described above, the viscosity of the electrolytes, the pressure of electrolytes, the flow velocities of the electrolytes, and the flow volumes of the electrolytes. In other words, a viscometer, a pressure sensor, a flow velocity meter, a flow volume meter, etc., can be used as the measurement sensor.

These physical quantities change depending on the state of charge (SOC) of the electrolytes and the temperatures of the electrolytes. Thus, in Modification Embodiment 3, a monitor cell for determining the state of charge is provided in addition to the above-described measurement sensor, for example. The state of charge can be found through an open circuit voltage of the monitor cell. In such a case, the relationship between three factors is determined in advance: the physical quantity obtained by the sensor, the state of charge obtained from the open-circuit voltage of the monitor cell, and the temperature of the electrolyte. Then the relationship is used as the reference data. On the basis of the measurement results of the respective sensors and the state of charge, the flow rate controller adjusts the flow rate variable mechanism to control the flow rates for the heat exchangers and the bypass flow channels.

MODIFICATION EMBODIMENT 4

The RF battery may be equipped with a heater that heats the electrolyte to a desired temperature. The installation site of the heater is, for example, inside a tank. The heater may be used to adjust the temperature of the electrolyte when the measurement result obtained from the measurement sensor is lower than the lower limit $x_1$ (° C.) described above so that the temperature falls within the set temperature range ($x_1$ (° C.)$\leq T_L \leq x_2$ (° C.)) by increasing the output of the heater. In this manner, overcooling of the electrolytes can be further suppressed by using the bypass flow channels and the heater, and in the event of overcooling the electrolyte can return to the appropriate temperature quickly.

MODIFICATION EXAMPLE 5

In Embodiments 1 to 4 and Modification Examples 1 to 4 the RF battery includes a cell stack in which multiple sub-stacks each including multiple battery cells are stacked. Alternatively, the RF battery may be a single-cell battery or may include a cell stack in which plural battery cells are stacked between a pair of inflow/outflow plates.

INDUSTRIAL APPLICABILITY

An electrolyte-circulating battery according to an embodiment of the present invention is suitable for usage whose objectives are to stabilize fluctuation in the power output obtained from new energy such as solar power and wind power, store power when there is excess power, and level the load, for example. The electrolyte-circulating battery according to an embodiment of the present invention is also suitable for use as a high-capacity storage battery installed in typical power plants to counteract instantaneous voltage drop and power failure, and load leveling.

REFERENCE SIGNS LIST

1 redox flow (RF) battery
10, 11 heat exchanger
20, 21 fan (cooling mechanism)
30, 31 bypass flow channel
40, 41, 42, 43 butterfly valve (flow rate variable mechanism)
50 control mechanism
51, 52 liquid temperature sensor (measurement sensor)

53 air temperature sensor (measurement sensor)
54 control unit
   540 flow rate controller, 541 cooling controller, 542 pump controller
100 battery cell
101 membrane, 102 positive electrode cell, 103 negative electrode cell
104 positive electrode, 105 negative electrode
106 positive electrode electrolyte tank, 107 negative electrode electrolyte tank
108, 109 inflow channel
110, 111 outflow channel
   110u, 111u upstream outflow channel
   110d, 111d downstream outflow channel
112, 113 pump, 114, 115 heat exchanger
120 cell frame, 121 bipolar plate, 122 frame
123, 124 inflow manifold, 125, 126 outflow manifold
127 seal member
200 cell stack, 200s sub-cell stack
201 inflow/outflow plate, 202i inflow pipe, 202o outflow pipe
210, 220 end plate
230 clamping mechanism
231 clamping shaft

The invention claimed is:

1. An electrolyte-circulating battery comprising a battery cell, a tank which stores an electrolyte and a circulation channel that circulates an electrolyte to the battery cell, wherein the electrolyte-circulating battery comprises:
   a heat exchanger installed in the circulation channel and configured to cool the electrolyte;
   an upstream outflow channel that connects the battery cell and the heat exchanger in the circulation channel;
   a downstream outflow channel that connects the tank and the heat exchanger in the circulation channel;
   a bypass flow channel that connects the upstream outflow channel and the downstream outflow channel so as to bypass the heat exchanger; and
   a flow rate variable mechanism capable of varying a flow rate of the electrolyte flowing through the heat exchanger and a flow rate of the electrolyte flowing through the bypass flow channel.

2. The electrolyte-circulating battery according to claim 1, comprising a measurement sensor that measures a physical quantity related to a temperature of the electrolyte; and
   a flow rate controller that controls a flow rate of the electrolyte that flows into the heat exchanger and a flow rate of the electrolyte that flows into the bypass flow channel by using the flow rate variable mechanism on a basis of a measurement result obtained from the measurement sensor.

3. The electrolyte-circulating battery according to claim 2, wherein the measurement sensor comprises at least one selected from a liquid temperature sensor that measures a temperature of the electrolyte and an air temperature sensor that measures an ambient temperature.

4. The electrolyte-circulating battery according to claim 2, comprising:
   a cooling mechanism that cools the heat exchanger; and
   a cooling controller that controls operation of the cooling mechanism on a basis of a measurement result obtained from the measurement sensor.

5. The electrolyte-circulating battery according to claim 2, comprising:
   a pump that circulates the electrolyte; and
   a pump controller that controls output of the pump on a basis of a measurement result obtained from the measurement sensor.

6. The electrolyte-circulating battery according to claim 1, wherein the flow rate variable mechanism comprises a valve that is disposed in the bypass flow channel and configured to open and close the flow channel.

* * * * *